United States Patent [19]

Shoemaker

[11] 4,373,785

[45] Feb. 15, 1983

[54] MICROSCOPE OBJECTIVE

[75] Inventor: Arthur H. Shoemaker, Orchard Park, N.Y.

[73] Assignee: Warner Lambert Technologies, Inc., Southbridge, Mass.

[21] Appl. No.: 256,325

[22] Filed: Apr. 22, 1981

[51] Int. Cl.³ .............................................. G02B 21/02
[52] U.S. Cl. .................................................... 350/414
[58] Field of Search ...................................... 350/414

[56] References Cited

U.S. PATENT DOCUMENTS 3,355,234  11/1967  Muller .
3,700,311  10/1972  Shoemaker ........................ 350/414

Primary Examiner—John K. Corbin
Assistant Examiner—Rebecca D. Gass
Attorney, Agent, or Firm—Alan H. Spencer

[57] ABSTRACT

A eight component, oil-immersion, apochromatic microscope objective has a numerical aperture of 1.30. When used with a telescope as described in U.S. Pat. No. 3,355,234, the objective provides a magnification of 100 X in an embodiment having a focal length of 1.824 mm and is well corrected for the usual chromatic image aberrations, spherical aberration, coma and astigmatism.

2 Claims, 1 Drawing Figure

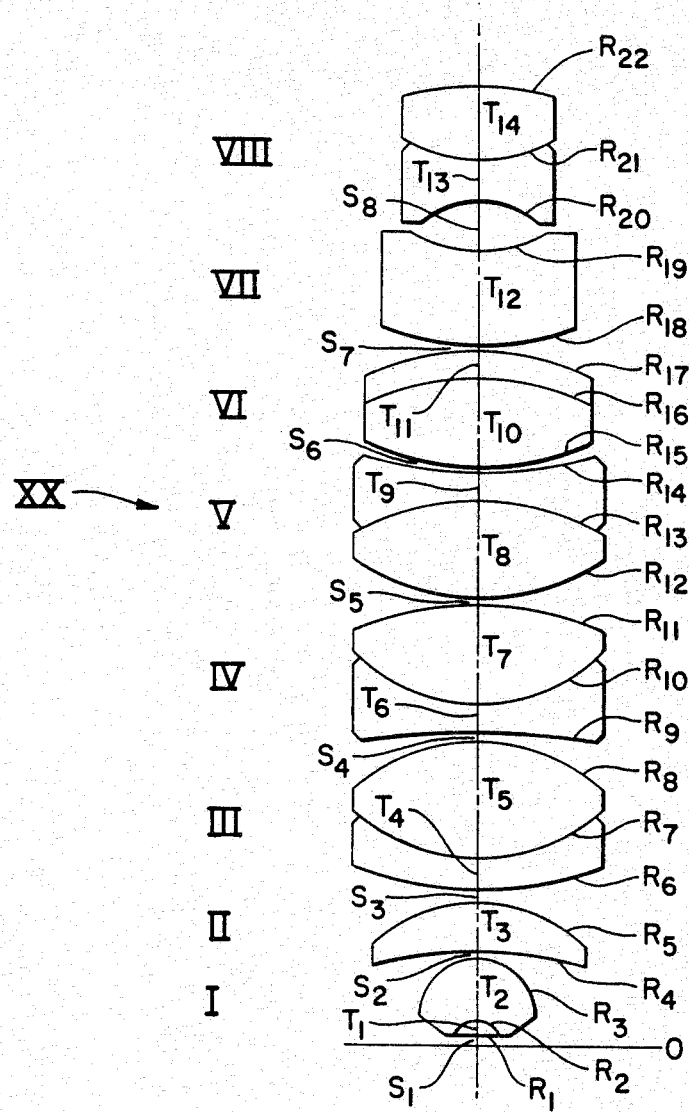

MICROSCOPE OBJECTIVE

BACKGROUND OF THE INVENTION

This invention relates to microscope objectives and more particularly to apochromatic microscope objectives having a numerical aperture of substantially 1.30 and a magnification of 100X, when used with a telescope objective as described in U.S. Pat. No. 3,355,234 and having a focal length of 1.824 mm.

Microscope objectives according to this invention are well corrected for the usual chromatic image aberrations, spherical aberration, coma and astigmatism when used with a telescope objective and have a substantially flat image field.

U.S. Pat. No. 3,700,311, issued Oct. 24, 1972, discloses an eight element, oil-immersion, apochromatic microscope objective having an N.A. of 1.30. The specific ranges of curves, thicknesses, spacings, indices of refraction and Abbe numbers, as well as the preferred embodiments are different, although the general configuration is the same as that of the present invention.

DESCRIPTION OF THE DRAWING AND INVENTION

The drawing is an optical diagram of an embodiment of the present invention.

Referring to the drawing, objective XX is shown in a view transverse to its optical axis relative to object plane 0 and illustrates the lens components aligned along the optical axis. The first component I of objective XX is a plano-convex positive doublet followed by a concavo-convex positive singlet II. A biconvex positive doublet III is next succeeded by a concavo-convex positive doublet IV and a convex-concavo positive doublet V. A biconvex positive doublet VI, convex-concavo negative singlet VII and concavo-convex positive singlet complete objective XX.

The parameters of objectives according to the present invention are set forth in Table I, wherein successive axial spaces are identified as $S_1$ to $S_8$ and axial thicknesses of successive lens elements are identified as $T_1$ to $T_{14}$. The radii of successive lens surfaces are designated $R_1$ to $R_{22}$ with the minus sign (−) being applied to the radius of a surface whose center of curvature lies on the object side of its vertex. The refractive indices and Abbe numbers of the successive lenses are absolute values designated $ND_1$ to $ND_{14}$ and $\nu_1$ to $\nu_{14}$ successively.

TABLE I

| Lens | Radius (R) | Thickness (T) | Spacing (S) | Refractive Index (ND) | Abbe No ($\nu$) |
|---|---|---|---|---|---|
| | | | $S_1 = 0.154F$ | | |
| | $R_1 = \infty$ | | | | |
| I | | $T_1 = 0.313F$ | | $1.535 < ND_1 < 1.545$ | $50.5 < \nu_1 < 51.5$ |
| | $R_2 = -0.583F$ | | | | |
| | | $T_2 = 1.568F$ | | $1.88 < ND_2 < 1.89$ | $41.5 < \nu_2 < 42.5$ |
| | $R_3 = -1.356F$ | | | | |
| | | | $S_2 = 0.011F$ | | |
| | $R_4 = -9.156F$ | | | | |
| II | | $T_3 = 1.118F$ | | $1.78 < ND_3 < 1.79$ | $50 < \nu_3 < 51$ |
| | $R_5 = -3.632F$ | | | | |
| | | | $S_3 = 0.291F$ | | |
| | $R_6 = 8.123F$ | | | | |
| III | | $T_4 = 0.658F$ | | $1.715 < ND_4 < 1.725$ | $34 < \nu_4 < 35$ |
| | $R_7 = 4.399F$ | | | | |
| | | $T_5 = 2.577F$ | | $1.43 < ND_5 < 1.44$ | $95 < \nu_5 < 96$ |
| | $R_8 = 4.399F$ | | | | |
| | | | $S_4 = 0.252F$ | | |
| | $R_9 = -21.809F$ | | | | |
| IV | | $T_6 = 0.658F$ | | $1.65 < ND_6 < 1.66$ | $39 < \nu_6 < 40$ |
| | $R_{10} = 3.907F$ | | | | |
| | | $T_7 = 2.248F$ | | $1.43 < ND_7 < 1.44$ | $95 < \nu_7 < 96$ |
| | $R_{11} = 7.204F$ | | | | |
| | | | $S_5 = 0.055F$ | | |
| | $R_{12} = 5.212F$ | | | | |
| V | | $T_8 = 2.193F$ | | $1.43 < ND_8 < 1.44$ | $95 < \nu_8 < 96$ |
| | $R_{13} = -5.869F$ | | | | |
| | | $T_9 = 0.658F$ | | $1.715 < ND_9 < 1.725$ | $34 < \nu_9 < 35$ |
| | $R_{14} = 10.204F$ | | | | |
| | | | $S_6 = 0.055F$ | | |
| | $R_{15} = 6.014F$ | | | | |
| VI | | $T_{10} = 1.919F$ | | $1.43 < ND_{10} < 1.44$ | $95 < \nu_{10} < 96$ |
| | $R_{16} = -6.014F$ | | | | |
| | | $T_{11} = 0.658F$ | | $1.715 < ND_{11} < 1.725$ | $34 < \nu_{11} < 35$ |
| | $R_{17} = -6.014F$ | | | | |
| | | | $S_7 = 0.055F$ | | |
| | $R_{18} = 6.272F$ | | | | |
| VII | | $T_{12} = 2.193F$ | | $1.62 < ND_{12} < 1.63$ | $46.5 < \nu_{12} < 47.5$ |
| | $R_{19} = 3.098F$ | | | | |
| | | | $S_8 = 1.069F$ | | |
| | $R_{20} = -2.209F$ | | | | |
| VIII | | $T_{13} = 0.987F$ | | $1.785 < ND_{13} < 1.795$ | $47 < \nu_{13} < 48$ |
| | $R_{21} = 3.410F$ | | | | |
| | | $T_{14} = 1.645F$ | | $1.78 < ND_{14} < 1.79$ | $25.5 < \nu_{14} < 26.5$ |

TABLE I-continued

| Lens | Radius (R) | Thickness (T) | Spacing (S) | Refractive Index (ND) | Abbe No ($\nu$) |
|---|---|---|---|---|---|
| | $R_{22} = -5.943F$ | | | | | wherein F is 1.80 to 1.85 mm.

A preferred embodiment of the present invention wherein F is 1.824 has the following parameters.

TABLE II

| Lens | Radius (R) | Thickness (T) | Spacing (S) | Refractive Index (ND) | Abbe No ($\nu$) |
|---|---|---|---|---|---|
| | $R_1 = \infty$ | | $S_1 = 0.28$ | | |
| I | | $T_1 = 0.57$ | | $ND_1 = 1.540$ | $\nu_1 = 51.1$ |
| | $R_2 = -1.063$ | $T_2 = 2.68$ | | $ND_2 = 1.883$ | $\nu_2 = 40.8$ |
| | $R_3 = -2.473$ | | $S_2 = 0.02$ | | |
| | $R_4 = -16.700$ | | | | |
| II | | $T_3 = 2.04$ | | $ND_3 = 1.786$ | $\nu_3 = 50.2$ |
| | $R_5 = -6.625$ | | $S_3 = 0.53$ | | |
| | $R_6 = 14.816$ | | | | |
| III | | $T_4 = 1.20$ | | $ND_4 = 1.720$ | $\nu_4 = 34.6$ |
| | $R_7 = 8.023$ | $T_5 = 4.70$ | | $ND_5 = 1.434$ | $\nu_5 = 95.6$ |
| | $R_8 = -8.023$ | | $S_4 = 0.46$ | | |
| | $R_9 = 39.779$ | | | | |
| IV | | $T_6 = 1.20$ | | $ND_6 = 1.654$ | $\nu_6 = 39.6$ |
| | $R_{10} = 7.127$ | $T_7 = 4.10$ | | $ND_7 = 1.434$ | $\nu_7 = 95.6$ |
| | $R_{11} = -13.140$ | | $S_5 = 0.10$ | | |
| | $R_{12} = 9.507$ | | | | |
| V | | $T_8 = 4.00$ | | $ND_8 = 1.434$ | $\nu_8 = 95.6$ |
| | $R_{13} = -10.705$ | $T_9 = 1.20$ | | $ND_9 = 1.720$ | $\nu_9 = 34.6$ |
| | $R_{14} = 18.612$ | | $S_6 = 0.10$ | | |
| | $R_{15} = 10.970$ | | | | |
| VI | | $T_{10} = 3.50$ | | $ND_{10} = 1.434$ | $\nu_{10} = 95.6$ |
| | $R_{16} = -10.970$ | $T_{11} = 1.20$ | | $ND_{11} = 1.720$ | $\nu_{11} = 34.6$ |
| | $R_{17} = -10.970$ | | $S_7 = 0.10$ | | |
| | $R_{18} = 11.440$ | | | | |
| VII | | $T_{12} = 4.00$ | | $ND_{12} = 1.624$ | $\nu_{12} = 47.0$ |
| | $R_{19} = 5.650$ | | $S_8 = 1.95$ | | |
| | $R_{20} = -4.029$ | | | | |
| VIII | | $T_{13} = 1.80$ | | $ND_{13} = 1.788$ | $\nu_{13} = 47.4$ |
| | $R_{21} = 6.220$ | $T_{14} = 3.00$ | | $ND_{14} = 1.784$ | $\nu_{14} = 26.1$ |
| | $R_{22} = -10.840$ | | | | |

What is claimed is:

1. An eight component, oil immersion apochromatic objective having an N.A. of 1.30 which has a plano-convex doublet I, a concavo-convex singlet II, a biconvex doublet III, a concavo-convex doublet IV, a convex-concavo doublet V, a biconvex doublet VI, a convex-concavo singlet VII and a concavo-convex doublet VIII having the parameters of the respective axial spacings ($S_0$–$S_8$) in mm, radii ($R_1$–$R_{22}$), in mm with a minus sign (−) indicating a center of curvature on the object side of the lens, thickness ($T_1$–$T_{14}$) in mm, indices of refraction ($ND_1$–$ND_{14}$) and Abbe numbers ($\nu_1$–$\nu_{14}$) are absolute values, all being determined by the following table:

| Lens | (R) | (T) | (S) | (ND) | ($\nu$) |
|---|---|---|---|---|---|
| | | | $S_1 = 0.154F$ | | |
| | $R_1 = \infty$ | $T_1 = 0.313F$ | | $1.535 < ND_1 < 1.545$ | $50.5 < \nu_1 < 51.5$ |
| I | $R_2 = -0.583F$ | $T_2 = 1.568F$ | | $1.88 < ND_2 < 1.89$ | $41.5 < \nu_2 < 42.5$ |
| | $R_3 = -1.356F$ | | $S_2 = 0.011F$ | | |
| | $R_4 = -9.156F$ | | | | |
| II | | $T_3 = 1.118F$ | | $1.78 < ND_3 < 1.79$ | $50 < \nu_3 < 51$ |
| | $R_5 = -3.632F$ | | $S_3 = 0.291F$ | | |
| | $R_6 = 8.123F$ | | | | |
| | | $T_4 = 0.658F$ | | $1.715 < ND_4 < 1.725$ | $34 < \nu_4 < 35$ |
| III | $R_7 = 4.399F$ | $T_5 = 2.577F$ | | $1.43 < ND_5 < 1.44$ | $95 < \nu_5 < 96$ |
| | $R_8 = -4.399F$ | | $S_4 = 0.252F$ | | |
| | $R_9 = -21.809F$ | | | | |
| | | $T_6 = 0.658F$ | | $1.65 < ND_6 < 1.66$ | $39 < \nu_6 < 40$ |

-continued

| Lens | Radius (R) | Thickness (T) | Spacing (S) | Refractive Index (ND) | Abbe No (ν) |
|---|---|---|---|---|---|
| IV | $R_{10}=3.907F$ | | | | |
| | | $T_7=2.248F$ | | $1.43<ND_7<1.44$ | $95<\nu_7<96$ |
| | $R_{11}=7.204F$ | | | | |
| | | | $S_5=0.055F$ | | |
| | $R_{12}=5.212F$ | | | | |
| | | $T_8=2.193F$ | | $1.43<ND_8<1.44$ | $95<\nu_8<96$ |
| V | $R_{13}=-5.869F$ | | | | |
| | | $T_9=0.658F$ | | $1.715<ND_9<1.725$ | $34<\nu_9<35$ |
| | $R_{14}=10.204F$ | | | | |
| | | | $S_6=0.055F$ | | |
| | $R_{15}=6.014F$ | | | | |
| | | $T_{10}=1.919F$ | | $1.43<ND_{10}<1.44$ | $95<\nu_{10}<96$ |
| VI | $R_{16}=-6.014F$ | | | | |
| | | $T_{11}=0.658F$ | | $1.715<ND_{11}<1.725$ | $34<\nu_{11}<35$ |
| | $R_{17}=-6.014F$ | | | | |
| | | | $S_7=0.055F$ | | |
| | $R_{18}=6.272F$ | | | | |
| VII | | $T_{12}=2.193F$ | | $1.62<ND_{12}<1.63$ | $46.5<\nu_{12}<47.5$ |
| | $R_{19}=3.098F$ | | | | |
| | | | $S_8=1.069F$ | | |
| | $R_{20}=-2.209F$ | | | | |
| | | $T_{13}=0.987F$ | | $1.785<ND_{13}<1.795$ | $47<\nu_{13}<48$ |
| VIII | $R_{21}=3.410F$ | | | | |
| | | $T_{14}=1.645F$ | | $1.78<ND_{14}<1.79$ | $25.5<\nu_{14}<26.5$ |
| | $R_{22}=-5.943F$ | | | | | wherein R is 1.80 to 1.85 mm.

2. The microscope objective according to claim 1 wherein F is 1.824, $ND_1$ is 1.540, $ND_2$ is 1.883, $ND_3$ is 1.786, $ND_4$, $ND_9$ and $ND_{11}$ are 1.720, $ND_5$, $ND_7$, $ND_8$ and $ND_{10}$ are 1.434, $ND_6$ is 1.654, $ND_{12}$ is 1.624, $ND_{13}$ is 1.788, $ND_{14}$ is 1.784, $\nu_1$ is 51.1, $\nu_2$ is 40.8, $\nu_3$ is 50.2, $\nu_4$, $\nu_9$ and $\nu_{11}$ are 34.6, $\nu_5$, $\nu_7$, $\nu_8$ and $\nu_{10}$ are 95.6, $\nu_6$ is 39.6, $\nu_{12}$ is 47, $\nu_{13}$ is 47.4 and $\nu_{14}$ is 26.1.

* * * * *